(12) United States Patent
Chow et al.

(10) Patent No.: US 11,755,194 B2
(45) Date of Patent: Sep. 12, 2023

(54) INTERACTIVE SEARCHING USING GESTURES ON ANY MOBILE SEARCH RESULTS PAGE

(71) Applicant: Capital One Services, LLC, McLean, VA (US)

(72) Inventors: Chih-Hsiang Chow, Plano, TX (US); Steven Dang, Plano, TX (US); Elizabeth Furlan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 34 days.

(21) Appl. No.: 17/064,274

(22) Filed: Oct. 6, 2020

(65) Prior Publication Data

US 2022/0107726 A1 Apr. 7, 2022

(51) Int. Cl.
| | |
|---|---|
| G06F 3/04883 | (2022.01) |
| H04L 67/02 | (2022.01) |
| G06F 3/0482 | (2013.01) |
| H04L 67/75 | (2022.01) |
| G06F 3/01 | (2006.01) |

(52) U.S. Cl.
CPC .......... *G06F 3/04883* (2013.01); *G06F 3/017* (2013.01); *G06F 3/0482* (2013.01); *H04L 67/02* (2013.01); *H04L 67/75* (2022.05)

(58) Field of Classification Search
CPC .... G06F 3/04883; G06F 3/0482; G06F 3/017; H04L 67/02; H04L 67/36; H04L 67/75
See application file for complete search history.

(56) References Cited

U.S. PATENT DOCUMENTS

| | | | |
|---|---|---|---|
| 6,057,845 A * | 5/2000 | Dupouy | G06F 3/04883 382/187 |
| 8,159,457 B2 | 4/2012 | Coe | |
| 8,196,066 B1 * | 6/2012 | Ouyang | G06F 3/0488 715/708 |
| 8,566,045 B2 | 10/2013 | Shaffer et al. | |
| 8,631,355 B2 | 1/2014 | Murillo et al. | |
| 8,910,253 B2 | 12/2014 | Johnson et al. | |
| 9,733,716 B2 | 8/2017 | Shaffer | |
| 10,261,985 B2 | 4/2019 | Mital et al. | |

(Continued)

OTHER PUBLICATIONS

JustGestures.com, "Just Gestures: Features", Available from the Internet at https://web.archive.org/web/20101217154510/http://justgestures.com/features/, Dec. 17, 2010, pp. 1-3.

*Primary Examiner* — Roberto Borja
(74) *Attorney, Agent, or Firm* — Sterne, Kessler, Goldstein & Fox P.L.L.C.

(57) ABSTRACT

Disclosed herein are system, method, and computer program product embodiments for associating a gesture to a website action. In an embodiment, an application receives a user instruction to associate a website action with a user gesture such that the website action occurs upon receipt of the user gesture and the user gesture relates to user input on a user device's display. Thereafter, based on the user instruction, the application creates and sends an interaction request to link the user gesture to the website action. The application then receives an acceptance message from the first website that indicates that the user gesture has been successfully linked to the website action.

20 Claims, 10 Drawing Sheets

200

| | ID | Gesture | Website Action |
|---|---|---|---|
| 206A | 1 | Freeform #1 | Menu of available actions |
| 206B | 2 | Freeform #2 | Bookmark page |
| 206C | 3 | City/State/Zip Code Text | Provide/filter based on city/state/zip code |
| 206D | 4 | Year Number | Provide/filter based on year |
| 206E | 5 | Color Text | Provide/filter based on color |

202 — Gesture column
204 — Website Action column

(56) References Cited

U.S. PATENT DOCUMENTS

| | | | |
|---|---|---|---|
| 2005/0246622 A1* | 11/2005 | Ahn | G11B 27/105 |
| | | | 715/201 |
| 2011/0196864 A1 | 8/2011 | Mason et al. | |
| 2011/0199386 A1* | 8/2011 | Dharwada | G06F 3/011 |
| | | | 345/592 |
| 2012/0072850 A1* | 3/2012 | Megiddo | G06F 16/958 |
| | | | 715/745 |
| 2012/0198026 A1* | 8/2012 | Roy | G06Q 30/0641 |
| | | | 709/217 |
| 2013/0300644 A1* | 11/2013 | Chen | G06F 3/017 |
| | | | 345/156 |
| 2014/0218343 A1 | 8/2014 | Hicks et al. | |
| 2015/0036928 A1* | 2/2015 | Sheth | G06F 3/01 |
| | | | 382/187 |
| 2017/0286385 A1* | 10/2017 | Hastings | G06F 40/197 |
| 2017/0359407 A1* | 12/2017 | Rothrock | G06F 9/54 |
| 2018/0293455 A1 | 10/2018 | Hardee et al. | |

\* cited by examiner

200

| ID | Gesture | Website Action |
|---|---|---|
| 1 | Freeform #1 | Menu of available actions |
| 2 | Freeform #2 | Bookmark page |
| 3 | City/State/Zip Code Text | Provide/filter based on city/state/zip code |
| 4 | Year Number | Provide/filter based on year |
| 5 | Color Text | Provide/filter based on color |

INTERACTIVE SEARCHING USING GESTURES ON ANY MOBILE SEARCH RESULTS PAGE

BACKGROUND

Users regularly access websites on their mobile devices. In doing so, users may be presented with websites that are difficult to navigate due to the poor design of the websites. For example, users may find it difficult to click on a button (e.g., a drop-down menu) of a website due to the button being small or the website not responding well (e.g., quickly) to the user's input. Consequently, users may select the wrong button on the website or not even be able to interact with the websites. Thus, users may find it challenging to perform the website's functions. Similarly, website servers may find it challenging to provide their websites to user's mobile devices.

BRIEF DESCRIPTION OF THE DRAWINGS

The accompanying drawings are incorporated herein and form a part of the specification.

FIG. 2 illustrates a user profile of user gestures associated with actions, according to some embodiments.

Figure 3:
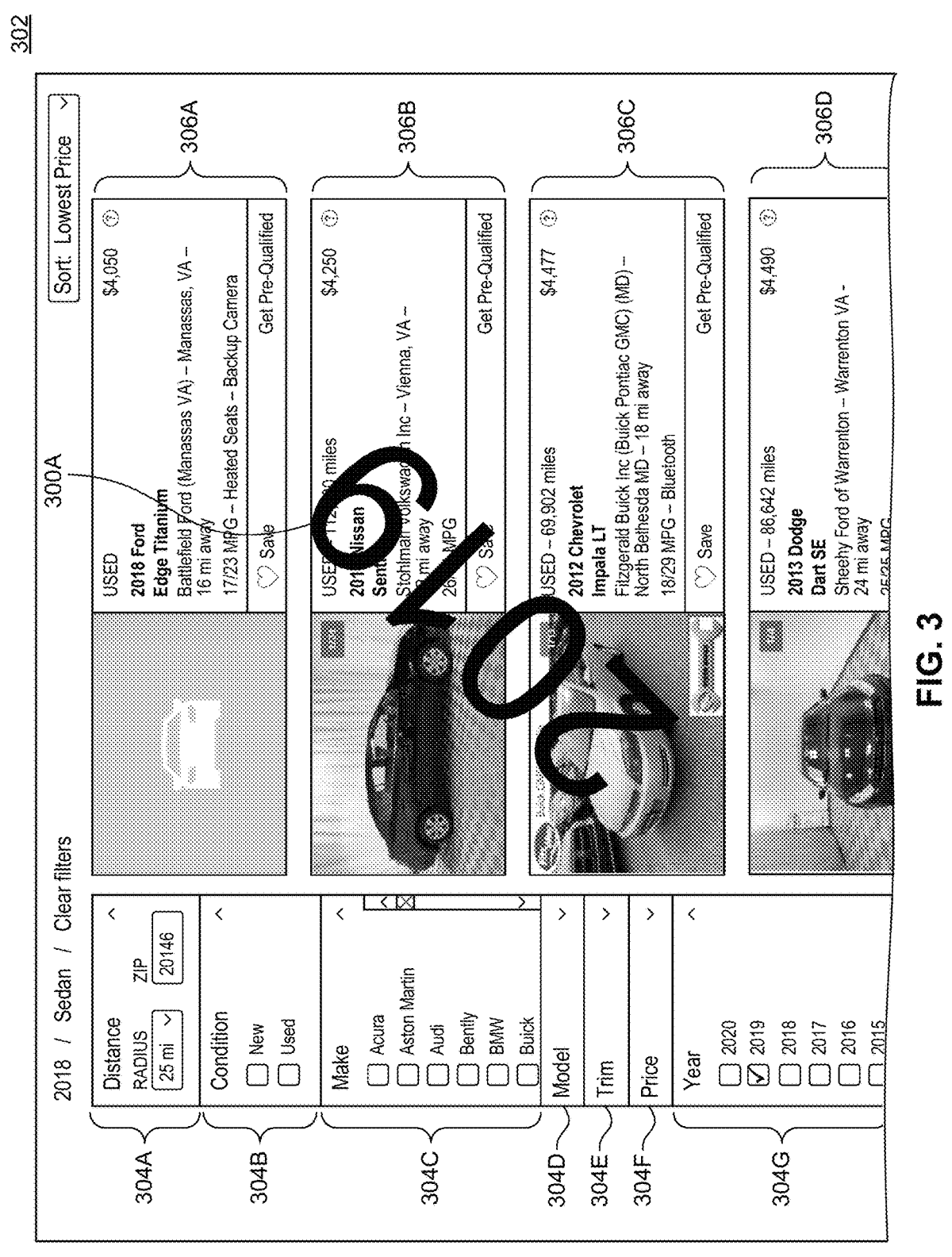

FIGS. 3-6 illustrate user gestures performed on a website, according to some embodiments.

FIGS. 7 and 8 illustrate a series of user interfaces resulting from a gesture associated with multiple actions, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a gesture profile for a user to search a website.

Figure 1:
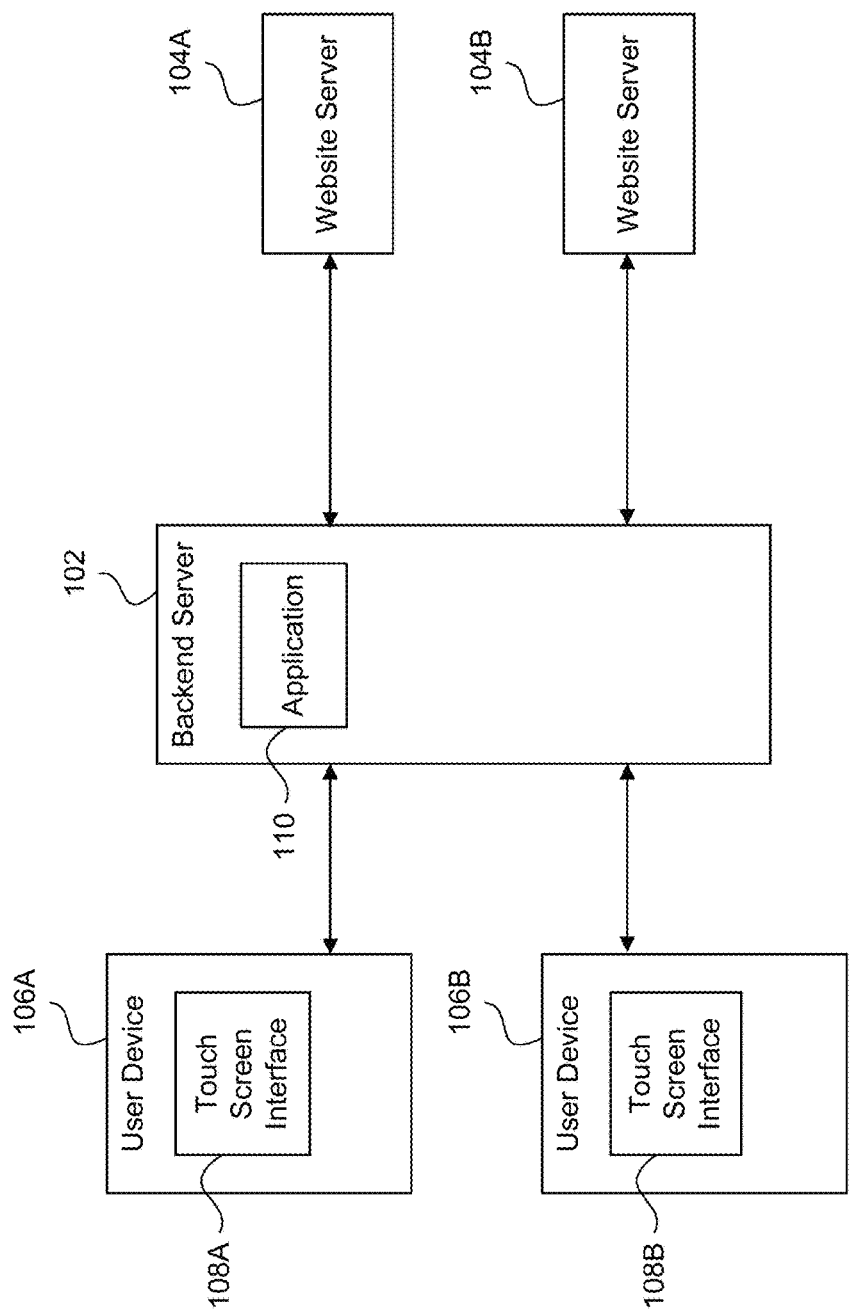
FIG. 1 is a block diagram of a system for assigning user gestures with actions of one or more websites, according to some embodiments.

FIG. 1 illustrates system 100 for assigning user gestures with actions of one or more websites, according to some embodiments. System 100 may include a backend server 102, one or more website servers 104A and 104B, and/or one or more user devices 106A and 106B. Backend server 102 and website server 104A and 104B may provide websites. User devices 106A and 106B may access the website. Accordingly, user devices 106A and 106B may include touch screen interface 108A and 108B for interacting with the websites, which may be integrated into or otherwise connected to user devices 106A and 106B. User devices 106A and 106B may be a mobile device, such as a smartphone, a personal digital assistant, or other types of handheld devices, where the touch screen interfaces 108A and 108B are displays of the respective mobile devices. Along these lines, user devices 106A and 106B may each be a mobile device that is accessible by any user or a particular user.

Backend server 102 and/or website server 104A and 104B may provide full websites (also known as a desktop website) designed for desktops and may thus not be optimized for mobile devices. Backend server 102 and website server 104A and 104B may also provide mobile-dedicated websites optimized for mobile devices. Along these lines, backend server 102 and/or website server 104A and 104B may provide complimentary full websites and mobile-dedicated websites for access by users on desktops and mobile devices, respectively. In some embodiments, the full websites may provide more content than their counterpart mobile-dedicated website, since desktops traditionally have a larger display screen and better resolution. Further, the full websites may present significantly more hypertext than their counterpart mobile-dedicated websites. Thus, mobile-dedicated websites may present their counterpart full website's hypertext via larger objects (e.g., bars, tabs, or buttons) for user interaction therewith. Additionally, the full website may be designed for a display device having a landscape orientation, whereas mobile-dedicated websites may be designed for display devices having a portrait orientation.

In some embodiments, users may only have access to, or prefer to access, backend server 102 and website server 104A and 104B's full websites. As a result, when user devices 106A and 106B are mobile devices, the users may not be able to adequately view the content of the full websites, for example, due to the screen size of the mobile devices and/or orientation of which they hold the mobile devices. Users may thus not be able to easily interact with the full website through user devices 104A and 104B.

Further, in some embodiments, users may find the user interface design of website server 104A and 104B's mobile-dedicated websites challenging to navigate, for example, due to the size of the user device 106A and 106B's respective touch screen interfaces 108A and 108B and/or the amount of content on the mobile-dedicated website. Also, since mobile-dedicated websites typically utilize more website pages than their full website content (e.g., due to the amount of content able to provide on mobile devices), users may seek to perform website actions associated with websites different from the one currently presented.

While the below description of embodiments will refer to website server 104A and user devices 106A as examples, one of skill in the art will recognize that the description of website server 104A applies similarly to other website servers, such as website server 104B, and that the description of user device 106A applies similarly to other user devices, such as user device 106B.

Backend server 102 may include application 110 for a user of a user device, such as user device 106A, to create a custom gesture profile. Alternatively, the user device's operating system may itself allow for creation of a custom gesture profile without a separate application 110, such that the custom gesture profile is accessible by any website or application running on the device. While embodiments herein refer to application 110, a person of skill in the art will recognize that such functionality of application 110 can be incorporated directly into the operating system of the user device, and accessible to mobile application or web developers.

The custom gesture profile can assist the user's interaction with the websites by utilizing user gestures provided by the user manually on user device 106A's touch screen interface 108A to trigger website actions. User gestures may be any physical user interaction by the user with user device 106A's manual touch screen interface 108A. Gestures may be defined by a time the user starts to interact with user device 106A's touch screen interface 108A (e.g., pressing a finger down on a mobile device's touch screen) to a time the user ends such interaction (e.g., removing the finger from the mobile device's touch screen). Example gestures may include a swipe in a particular direction, a circle, a word, a zigzag, a number, or a letter, to provide a few examples. Alternatively, gestures may be defined by the combination of sub-gestures occurring in succession within a given time threshold, such as the two crossing lines needed to form an "X" or "+" shape. In some embodiments, a gesture acts as a selection or instruction; in other embodiments, a gesture may also provide information. For example, on a vehicle search website the gesture of writing the phrase "2019" may be interpreted as a search query requesting that the search be limited to vehicles having a model year of 2019.

Application 110 may be downloadable by users of user devices 106A and 106B, for example, upon access to backend server 102 and/or website server 104A or 104B's websites. Application 110 can also be an add-on or an extension to websites provided by backend server 102 and/or website servers 104A and 104B. Accordingly, application 110 may add to or modify the capabilities of the websites. For example, as stated previously, in some embodiments, websites may or may not be capable of determining website actions corresponding to user gestures. Accordingly, when backend server 102 and/or website server 104A, for example, are not inherently capable of determining website actions corresponding to gestures, application 110 can derive the gestures based on the user's input and inform the website of the corresponding website actions. However, when backend server 102 and/or website servers 104A and 104B can determine web site actions corresponding to gestures, application 110 may permit users to provide their preferred gestures for performing certain website actions. For example, in some embodiments, upon a user's accessing backend server 102 and/or website server 104A's website, application 110 may provide the user with an option to create a custom user profile.

Backend server 102 and/or application 110 may store and/or manage a user account associated with the custom gesture profile. The user account may have a user name and password unique to the user. By creating the custom gesture profile and/or user account, a user may download the application 110 on one or more user devices (e.g., new personal mobile devices, private mobile devices, and public mobile devices) and access their saved custom gesture profile via those devices. Users may then provide the gesture indications and/or corresponding website action descriptions such that the same gestures across different websites invoke the corresponding website actions.

Accordingly, website action descriptions may correspond to any website action that the website permits. For example, in some embodiments, the website actions may relate to scrolling up or down, logging in, filtering one or more objects, and/or advancing or reverting to a particular webpage, to provide some examples. The website actions may also relate to reconfiguring the user interface design of the website, for example, by permitting moving one or more buttons and/or taskbars of the website.

Along these lines, the website actions may occur upon performing a required input, such as selecting a website button (e.g., a user interface element for logging in) and/or inputting one or more characters (e.g., a word or a phrase for searching for a particular object). Further, the website actions may occur upon the user input of a website-defined gesture. As will be discussed in more detail below, the website-defined gesture may or may not conflict with and/or override the application-defined gesture and/or the user-defined gesture.

FIG. 2 illustrates user profile 200 having gesture descriptions 202 and associated website action descriptions 204. User profile 200 may permit one or more entries 206A-E for gesture descriptions 202 and corresponding website action descriptions 204.

In some embodiments, upon creating a user profile, application 110 (of FIG. 1) may provide a user with one or more entries 206A-E for associating gestures to website actions. Application 110 may initially provide recommended application-defined gesture descriptions 202 for performing specific website actions 204 in one or more entries 206A-E. As stated above, backend server 102 (of FIG. 1) may provide websites. Accordingly, backend server 102's website may provide website action descriptions 204 associated with the recommended application-defined gestures. Application 110 may or may not permit the user to edit the recommendations (i.e., recommended application-defined gesture descriptions 202 and/or website action description 204). If application 110 permits the user to edit the recommendations, application 110 may provide the users with a list of available application-defined gesture descriptions and/or a list of website action descriptions. Application 110 may also provide a user with an option to create a custom gesture. In doing so, application 110 may override a preassigned application-specified gesture—associated with a specific website action—with a user-specified gesture. Accordingly, the website action occurs upon receipt of the user-specified gesture instead of the preassigned application-specified gesture.

Accordingly, for each entry 206A-E, whether application 110 (of FIG. 1) provides recommendations or blank entries, application 110 may permit a user to select a particular application-defined gesture description 202 and/or an option to create a custom gesture. Upon selecting an option to create a custom gesture, application 110 may permit the user to create the gesture on the user device's touch screen interface (e.g., user device 106A's touch screen interface 108A of FIG. 1). Along these lines, in some embodiments, as illustrated, gesture descriptions 202 can be a user-provided freeform (e.g., a user provides the gestures on a touch interface of a user device) or user-inserted text. For example, the gesture description "City/State/Zip Code" can relate to a user's freeform or text input of a city, a state, and/or a zipcode, the gesture description "Year" can relate a user's freeform or text input of a year, and the gesture description "Color" can relate to a user's freeform or text input of a color.

Application 110 may also permit a user to select a particular website action description 204 from a list of available website action descriptions. Therefore, application 110 may permit the user to associate any system-defined gesture description and/or user-defined gesture description with any website action description 204. Application 110 may also permit the user to associate a select combination of gesture descriptions 202 and website action descriptions 204. For example, for user-defined gesture action descriptions or system-defined gesture action descriptions, application 110 may permit the selection of a subset of website action descriptions and vice-versa. As illustrated and discussed in more detail below, upon receiving the gesture described by gesture description "Freeform #1," application 110 can provide a menu of options provided by a website. Further, upon receiving the gesture described by gesture description "Freeform #2," application 110 can provide a bookmark of the current webpage of the website. In addition, upon receiving the gesture described by gesture description "City/State/Zip Code," application 110 can provide or filter website content (e.g., cars) based on user's text input (e.g., a city, a state, and/or a zipcode). And, upon receiving the gesture described by gesture descriptions "Year Number" and/or "Color," application 110 can provide and/or filter website content (e.g., cars) based on the user's inputted year and/or color, respectively. In such a way, a given gesture can not only effect specific functionality, but can also be used to provide information (e.g., provide a search filter input) to the website. For example, in some embodiments, some user gestures may be considered input for building a search query or set of filters, while other user gestures may be considered selections from a predefined list of values/parameters.

In turn, referring to FIG. 1, in creating the user profile 200 (of FIG. 2), application 110 may receive a user instruction to associate a particular application-defined gesture or user-defined gesture with a particular application-defined website action or user-defined website action. In response, application 110 may link the application-defined gesture or user-defined gesture with the application-defined website action or user-defined website action. By doing so, upon receiving a particular gesture, application 110 may determine an appropriate website action. As will be discussed in more detail below, application 110 may then send this request to various websites.

Thus, after creating user profile 200 (of FIG. 2) and a user vising a website of backend server 102 and/or website server 104A, application 110 may send an interaction request to the website. The interaction request can inform the website that the application 110 would like to link gestures to website actions. For example, in some embodiments, the request can include the specific gestures and website actions specified in user profile 200 (of FIG. 2).

As stated above, backend server 102 and/or website server 104A may host the website. Thus, backend server 102 and/or website server 104A may provide a response (e.g., an acceptance or a denial) to the interaction request to link all or some of the gestures to website actions. For example, in some embodiments, backend server 102 and/or website servers 104A can provide their own gestures for certain website actions. Accordingly, in some embodiments, backend server 102 and/or web site server 104A may not permit some or all of the user's gestures to associate to those website actions. In turn, backend server 102 and/or website server 104A may also provide their own specified gestures, as well as those specified by the user in user profile 200 (of FIG. 2), to be linked to the same website actions.

Accordingly, upon receiving the interaction request to link user gestures to certain actions, backend server 102 and/or website server 104A may determine whether to approve or deny the interaction request. Thereafter, backend server 102 and/or website server 104A may provide a notification to application 110 of the approval or denial of the interaction request. For example, after determining to approve the interaction request, backend server 102 and/or website server 104A may send an acceptance message. Along with the acceptance message, backend server 102 and/or website server 104A may provide a different link for each combination of the user-specified gestures, application-specified gestures, and website-specified gestures with the website actions. The link for each combination may be a tag, a text path, or an identifier. Backend server 102 and/or website server 104A may also include a reference number unique to the user profile 200 (of FIG. 2).

Thus, application 110 may or may not interact with backend server 102 during the creation of the custom gesture profile or upon receiving a user-specified gesture. As stated previously, backend server 102 and/or application 110 may store the custom gesture profile. Accordingly, application 110 alone or in communication with backend server 102 may create the custom gesture profile. For example, in some embodiments, without communicating with backend server 102, application 110 may store and manage the custom gesture profile for a period of time (e.g., a period of time when backend server 102 is unavailable). During this period of time, application 110 may communicate with website server 104A hosting the website, for example, to send an interaction request for linking a user-specified gesture to a website-specified response and/or a direction message to perform the website-specified response. Alternatively, in some embodiments, application 110 may send the custom gesture profile to backend server 102 for approval before communicating with website 104A.

Along these lines, in some embodiments, after creating the custom gesture profile and receiving a user-specified gesture from the user, application 110 may send the gesture to backend server 102—which stores the custom gesture profile—for determining a corresponding website action. Application 110 may then receive the corresponding website action from backend server 102 and send the corresponding website action to website server 104A hosting the website to perform the website action. Alternatively, in some embodiments, upon receiving a user-specified gesture from the user, application 110 may use a locally stored custom gesture profile to determine a corresponding website action. After receiving or determining the website action, application 110 may then send a direction message to the website server 104A hosting the website to perform the website action.

In some embodiments, the website itself may provide default gestures to be used with website action descriptions 204, such that no new assignment of gestures need be made. In some embodiments, application 110 may need to make no changes to the website in order for the user to utilize the website-defined gestures. Application 110 may in turn provide a user with these website-defined gestures for performing specific website actions 204, such that the user can simply use those gestures that have already been defined. Application 110 may or may not permit the user to edit the website-defined gesture assignments. If the user is permitted to edit the website-defined gesture assignments, application 110 may override a website-specified gesture—associated with a specific website action—with a user-specified gesture. Alternatively, the website-defined gesture assignments may take the place of any user-defined gesture.

In some embodiments, by linking gestures to website actions, application 110 may provide additional or modified capabilities to the website. For example, application 110 may permit certain website-specified gestures on specific webpages. In contrast, application 100 may permit any user-specified gesture across any webpage of one or more websites. Further, application 110 may override certain website-specified gestures associated with designated website actions for user-specified gestures such that the designated website actions occur upon the user-specified gestures instead of the website-specified gestures.

After linking gestures to website actions, application 110 may provide a user interface for receiving the gestures. For example, in some embodiments, application 110 may provide a user interface in the form of an interactive overlay over all or part of the portion of the website shown on the display portion (e.g., touch screen interface 108A) of, for example, user device 106A. The interactive overlay may be invisible and permit a user to view the underlying website on the display portion (e.g., touch screen interface 108A) of user device 106A. In some embodiments, application 110 may dedicate a portion of user device 106A's display to receive the user gestures. Accordingly, website server 104A may present the websites around this portion of the display of user device 106A.

Accordingly, the interactive overlay may receive various gestures from the user. Upon receipt of a particular gesture via an interactive overlay, application 110 may first identify the intended gesture of the user. Application 110 may then determine the website action corresponding to the gestures. After determining the appropriate website action, application 110 may then send a direction message to website server 104A hosting the website to perform the particular website action. The message may be sent over the designated link (e.g., a tag, a text path, and/or an identifier) so that the website can determine the appropriate website action to take.

FIGS. 3-6 illustrate user gestures 300, 400, 500A-C, and 600 provided on websites 302, 402, 502, and 602, according to some embodiments. Websites 302, 402, 502, and 602 can include one or more website features 304A-G, 404A-G, 504A-G, and 604A-G for interacting with the websites 302, 402, 502, and 602. Website features 304A-G, 404A-G, 504A-G, and 604A-G may correspond to performing various website actions with respect to website records 306A-D, 406A-D, 506A-D, and 606A-D. Website features 304A-G, 404A-G, 504A-G, and 604A-G may be buttons, links, forms, or any other component provided on the websites 302, 402, 502, and 602.

As stated previously, user gestures 300, 400, 500A-C, and 600 may correspond respectively to website features 304A-G, 404A-G, 504A-G, and 604A-G. In turn, in some embodiments, user gestures 300, 400, 500A-C, and 600 may correspond to the same underlying website action, such that multiple different gestures 300, 400, 500A-C, and 600 can respectively result in the same website action. Additionally, user gestures 300, 400, 500A-C, and 600 may correspond to a website action that is already provided for in website features 304A-G, 404A-G, 504A-G, and 604A-G. For example, as illustrated, website features 304A-G, 404A-G, 504A-G, and 604A-G may correspond to filters for viewing website records 306A-D, 406A-D, 506A-G, and 606A-D. Accordingly, referring to FIG. 3, user gesture 300A may be a filter word—e.g., the year "2019"—that corresponds to website feature 304G—e.g., the "Year" filter. Similarly, user gesture 300B may be an indication of desired content—e.g., a circle or another informative mark—and correspond to feature 304G—e.g., the "Year" filter. Thus, website 302 permits filtering by the year "2019" by the user providing gesture 300A or 300B, or by simply selecting the appropriate input within feature 304G.

Figure 4:
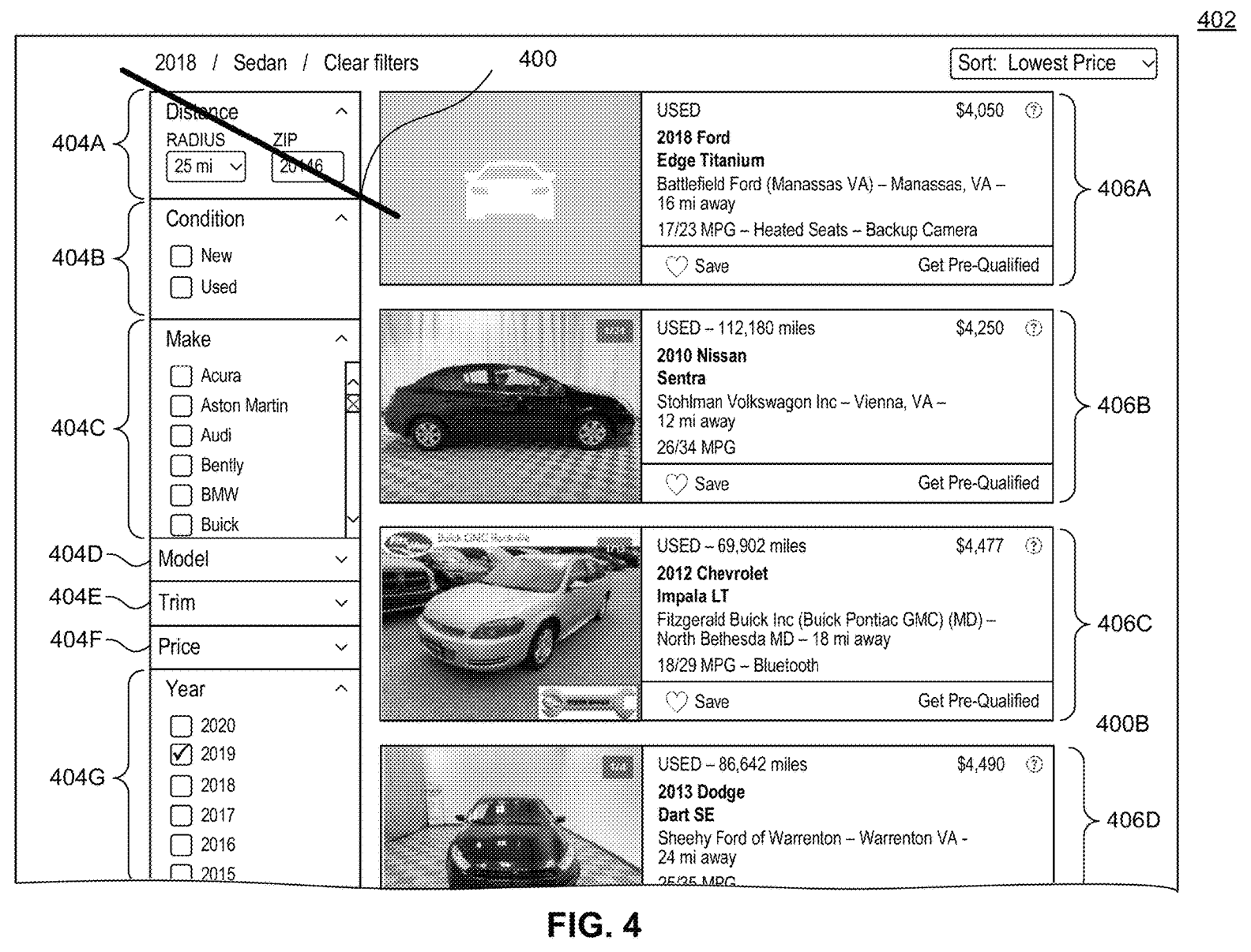
Figure 5:
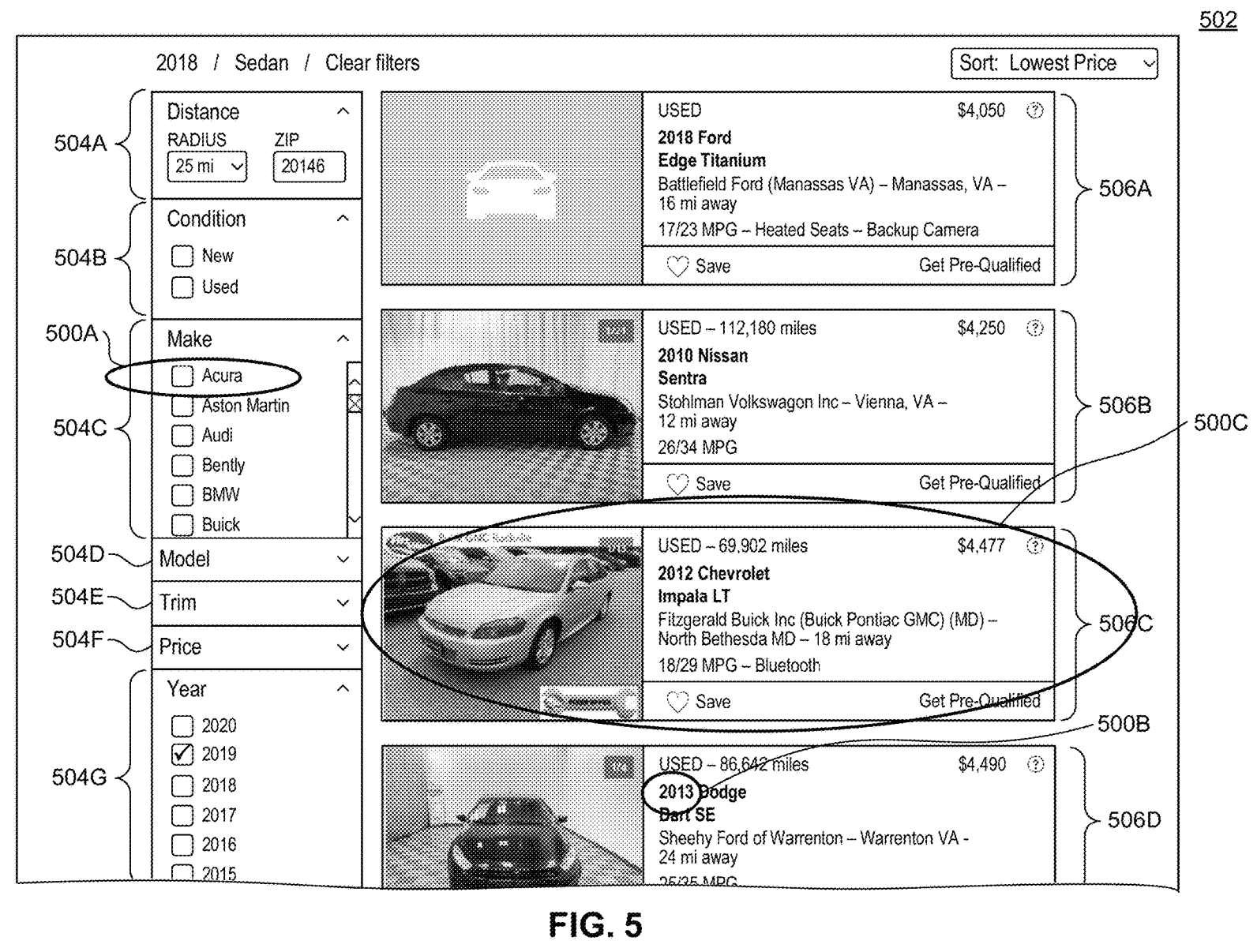
Figure 6:
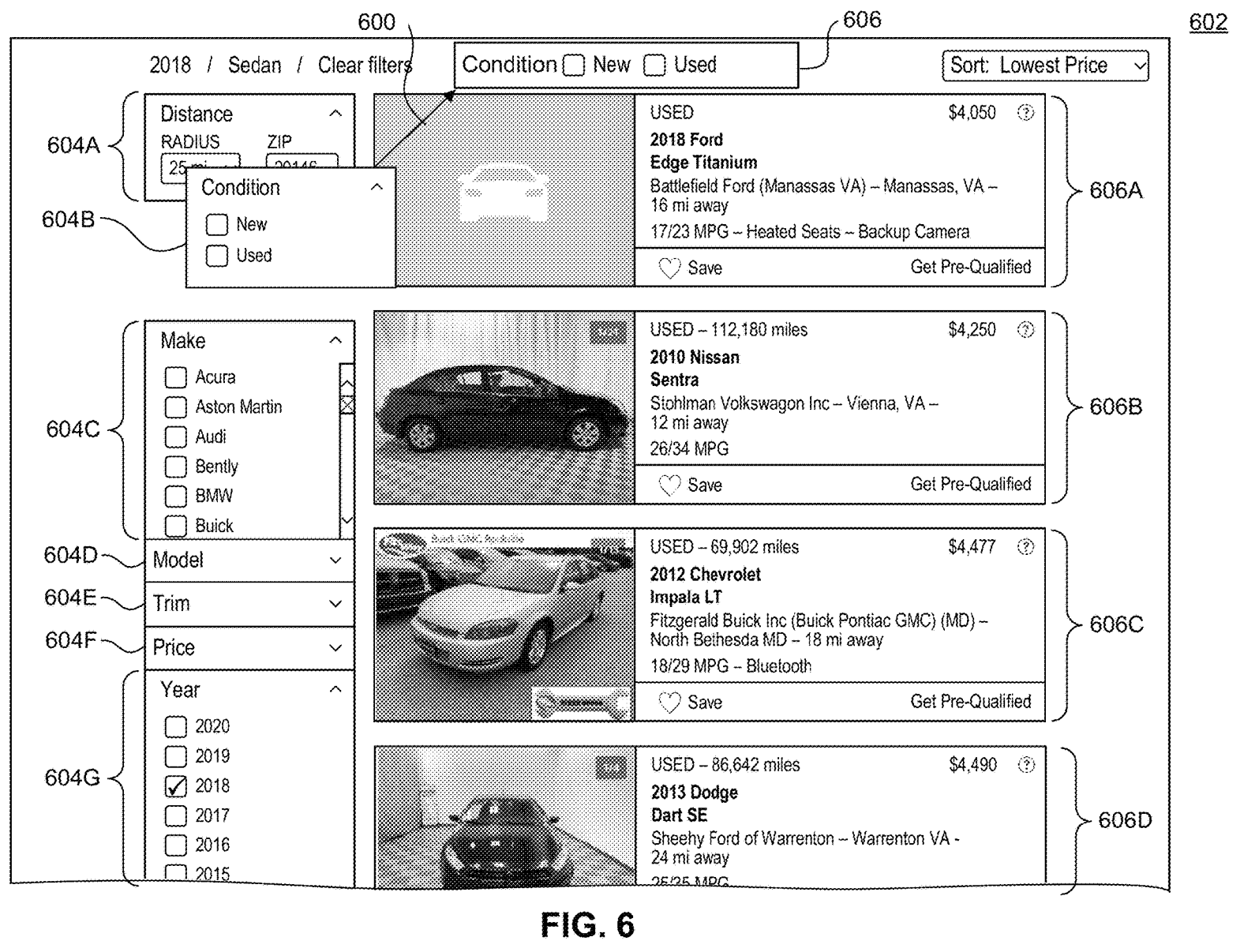

Further, in some embodiments, referring to FIGS. 4-6, user gesture 400, 500A-C, or 600 may perform website actions not already provided by website features 404A-G, 504A-G, and 604A-G. For example, referring to FIGS. 4 and 5, when website 402 and 502 are capable of performing searches, one or more website features 404A-G and 504A-G may relate to search filters of website 402 and 502. In response to website filters 404A-G and 504A-G, website 402 and 502 may present website records 406A-D and 506A-D. Accordingly, instead of interacting directly with website filters 404A-G and 504A-G, user gesture 400 and 500A-C may permit a user to modify the website content 406A-G and 506A-G, respectively.

In some embodiments, referring to FIG. 4, user gesture 400 may relate to removing one or more website features 404A-G and/or website records 406A-D from website 402. User gesture 400 may, for example, involve a user drawing an "X" symbol (or another known symbol designating removal) on a particular website filter 404A-G and/or a particular record 406A-D. In response, application 110 (of FIG. 1) can remove (or discard) the particular website feature 404A-G and/or the particular website record 406A-D. This can exclude information relating to the particular website feature 404A-G and/or the particular record 406A-D from the search. For example, as illustrated, the website feature 404A can relate to providing search results within a designated radius from a particular location. Thus, removing website feature 404A may result in removing this filtering limitation. Along these lines, application 110's removal of a particular website feature 404A-G may result in website 402 presenting different website records 406A-D.

Further, referring to FIG. 5, user gesture 500A-C may relate to a desired aspect of website 502. User gesture 500A-C may relate to a user drawing a circle around website content of a particular website feature 504A-G and/or a particular website record 506A-D. For example, when a user provides user gesture 500A upon website content (e.g., "Acura") of a particular website feature 504C (e.g., "Make"), website 502 may present website records 506A-D relating to the selected website content filter. Similarly, when a user provides user gesture 500B on website content (e.g., "2013") of a particular website record 506D, website 502 may present website records 506A-D relating to the selected website content filter. Additionally, when a user provides user gesture 500C around an entire website record 506C (or at least a majority thereof), website 502 may present a new webpage relating to the selected website record 506C.

Additionally, referring to FIG. 6, user gesture 600 may permit a user to move website features 604A-G from one location to another location of website 602. User gesture 600 may relate to a user, for example, pressing down on website feature 604B for a predetermined time period and dragging website feature 604B to a preferred location on website 602. Accordingly, users may modify the layout of website 602 through one or more user gestures 600.

Along these lines, although not illustrated, in an embodiment, user gesture 600 may perform a website action independent from website 402. In doing so, a user gesture 600 may permit a user to perform one or more operations with respect to website 602. For example, a user gesture 600 may permit bookmarking a webpage, printing a webpage, and navigating to a previously viewed webpage.

Figure 7:
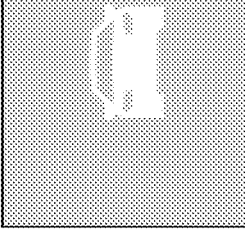
Figure 8:
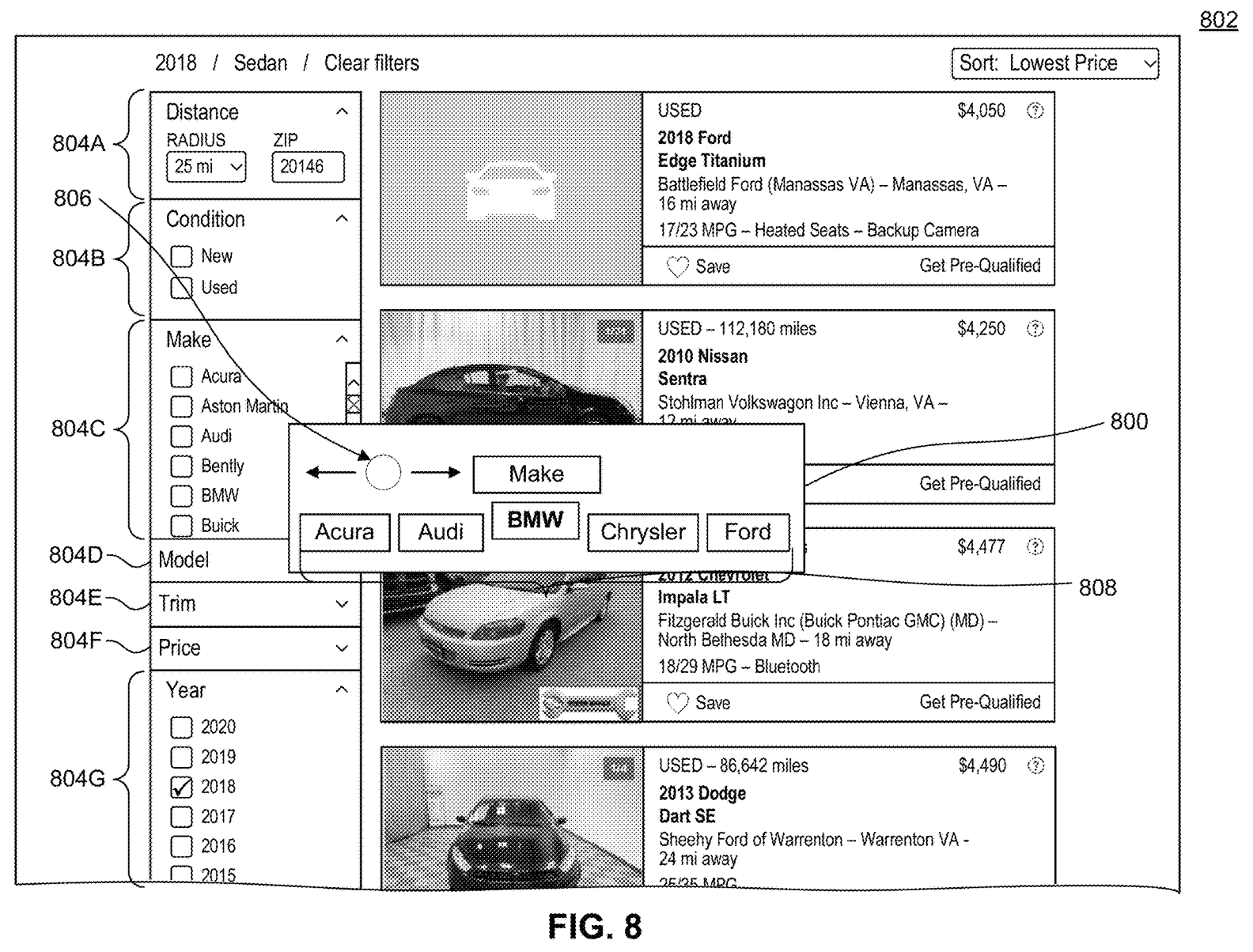

FIGS. 7 and 8 illustrate interactive windows 700 and 800 generated in response to user gestures provided on websites 702 and 602, respectively, according to some embodiments. As discussed above, websites 702 and 802 can include one or more website features 704A-G and 804A-G, respectively, for interacting with the respective websites 702 and 802. Further, various user gestures (not illustrated) may correspond to website features 704A-G and 804A-G. In turn, in some embodiments, some user gestures may correspond to the same website actions provided by features 704A-G and 804A-G.

For example, referring to FIG. 7, upon performing an initial gesture 706 (e.g., a two-finger circle), application 110 (of FIG. 1) may provide interactive window 700. Interactive window 700 may include one or more macros 708 for user selection. Interactive window 700's macros 708 may correspond to one or more website features 704A-G (e.g., website filters). In some embodiments, as illustrated, macros 708 can be presented as a turntable. Interactive window 700 may thus permit a user to select one of macros 708 by continually performing the initial gesture (e.g., the two-finger circle—as shown by gesture 706—to select a particular macro 708. By doing so, the user can trigger the interactive window and select a particular macro 708 by performing the same gesture (e.g., without removing a finger). Further, as illustrated, interactive display 700 may present the macros as a turntable of options. Accordingly, the user can continually circle their fingers in either direction of the circle to turn the turntable of macros 708 in either direction and land on different macros 708. In some embodiments, the user can select a desired macro 708 by removing one finger.

Referring to FIG. 8, upon selecting a particular macro 708 in interactive window 700 (of FIG. 7), application 110 (of FIG. 1) may present interactive window 800. Interactive window 800 may include one or more macros 808 for user selection. Like macros 708, macros 808 may relate to one or more website features 804A-G. In some embodiments, interactive window 800's macros 808 may be a subset of interactive window 700's macros 708 (of FIG. 7). As illustrated, interactive window 700's macros 708 may include "Make," "Model," "Distance," "Trim," and "Price." Upon selection of the interactive window 700's macro 708 "Make," interactive window 800's macros 808 may include "Acura," "Audi, "BMW," "Chrysler," and "Ford." As such, in some embodiments, macros 808 may be sub-website features of website 802.

As discussed above, the user may perform a particular gesture 706 to trigger the interactive window 700 and land on different macros 708 provided in the interactive window 700 (of FIG. 7). In some embodiments, as also discussed above, the particular gesture 706 may be a two-finger circle. Accordingly, the user may select a particular macro 708 by removing a single finger. Thereafter, when application 110 (of FIG. 1) presents interactive window 800, the user may still have a single finger on a user interface. Accordingly, the user may move their finger to the left or right to land on different macros. The user may then remove their finger to select a desired macro 808.

Figure 9:
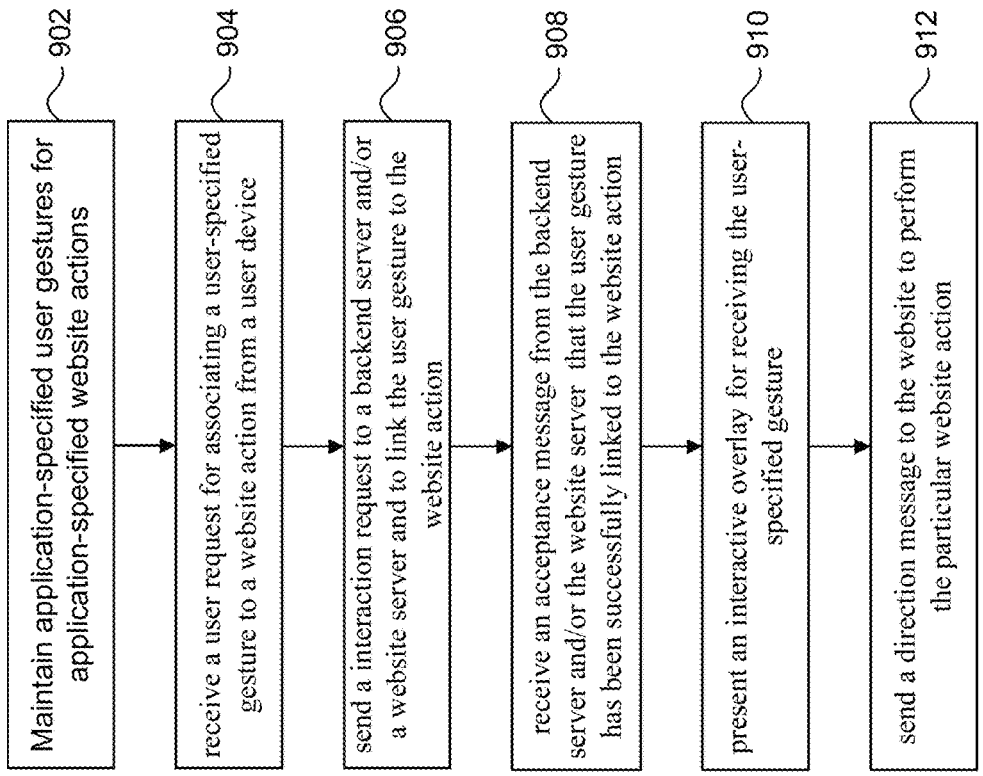
FIG. 9 is a flowchart illustrating a process for providing a gesture profile for a user to search a website, according to some embodiments.

FIG. 9 is a flowchart for a method 900 for providing a gesture profile for a user to search a website, according to an embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 9, as will be understood by a person of ordinary skill in the art.

Method 900 shall be described with reference to FIGS. 1 and 2. However, method 900 is not limited to that example embodiment.

In 902, application 110 can maintain application-specified user gestures for application-specified website actions. A user may create a user profile for performing the same gestures across different websites and triggering the same website actions. Accordingly, in creating a user profile, application 110 may initially provide recommended application-defined gesture descriptions 202 for performing specific website actions 204.

In 904, application 110 can receive a user request for associating a user-specified gesture to a website action from a user device, such as user device 106A or 106B. Application 110 may permit a user to select a particular application-defined gesture description 202 and/or an option to create a custom gesture. Upon selecting an option to create a custom gesture, application 110 may permit the user to create the gesture on the user device's touch screen interface (e.g., user device 106A's touch screen interface 108A of FIG. 1). Along these lines, in some embodiments, as illustrated, gestures descriptions 202 can be a user-provided freeform (e.g., a user provides the gestures on a touch interface of a user device) or user-inserted text. For example, the gesture description "City/State/Zip Code" can relate to a user's text input of a city, a state, and/or a zip code, the gesture description "Year" can relate a user's text input of a year, and the gesture description "Color" can relate to a user's input text of a color.

Application 110 may also permit a user to select a particular website action description 204 from a list of available website action descriptions. Therefore, application 110 may permit the user to associate any system-defined gesture description and/or user-defined gesture description with any website action description 204. Application 110 may also permit the user to associate a select combination of gesture descriptions 202 and website action descriptions 204. For example, for user-defined gesture action descriptions or system-defined gesture action descriptions, application 110 may permit the selection of a subset of website action descriptions and vice-versa.

In 906, application 110 can send an interaction request to backend server 102 and/or website servers 104A and 104B to link the user gesture to the website action such that the backend server and/or website server 104A and 104B provide the website action. Upon receiving the interaction request to link user gestures to certain actions, backend server 102 and/or website server 104A, for example, may determine whether to approve or deny the interaction request. After determining to approve the interaction request, backend server 102 and/or website server 104A may send an acceptance message. Along with the acceptance message, backend server 102 and/or website server 104A may provide a different link for each combination of the user-specified gestures, application-specified gestures, and website-specified gestures with the website actions. The link for each combination may be a tag, a text path, or an identifier.

In 908, application 110 can receive an acceptance message from backend server 102 and/or website servers 104A and 104B that the user gesture has been successfully linked to the website action.

In 910, application 110 can present an interactive overlay for receiving the user-specified gesture. The interactive overlay may cover over all or part of the portion of the website shown on the display portion (e.g., touch screen interface 108A) of, for example, user device 106A. The interactive overlay may be invisible and permit a user to view the underlying website on the display portion (e.g., touch screen interface 108A) of user device 106A. In some embodiments, application 110 may dedicate a portion of user device 106A's display to receive the user gestures. Accordingly, website server 104A may present the websites around this portion of the display of user device 106A.

In 912, application 110 can send a direction message to the website to perform the particular website action. The message may be sent over the designated link (e.g., a tag, a text path, and/or an identifier) so that the website can determine the appropriate website action to take. Upon receipt of the direction message, the website may perform the website action corresponding to the user-specified gesture.

Figure 10:
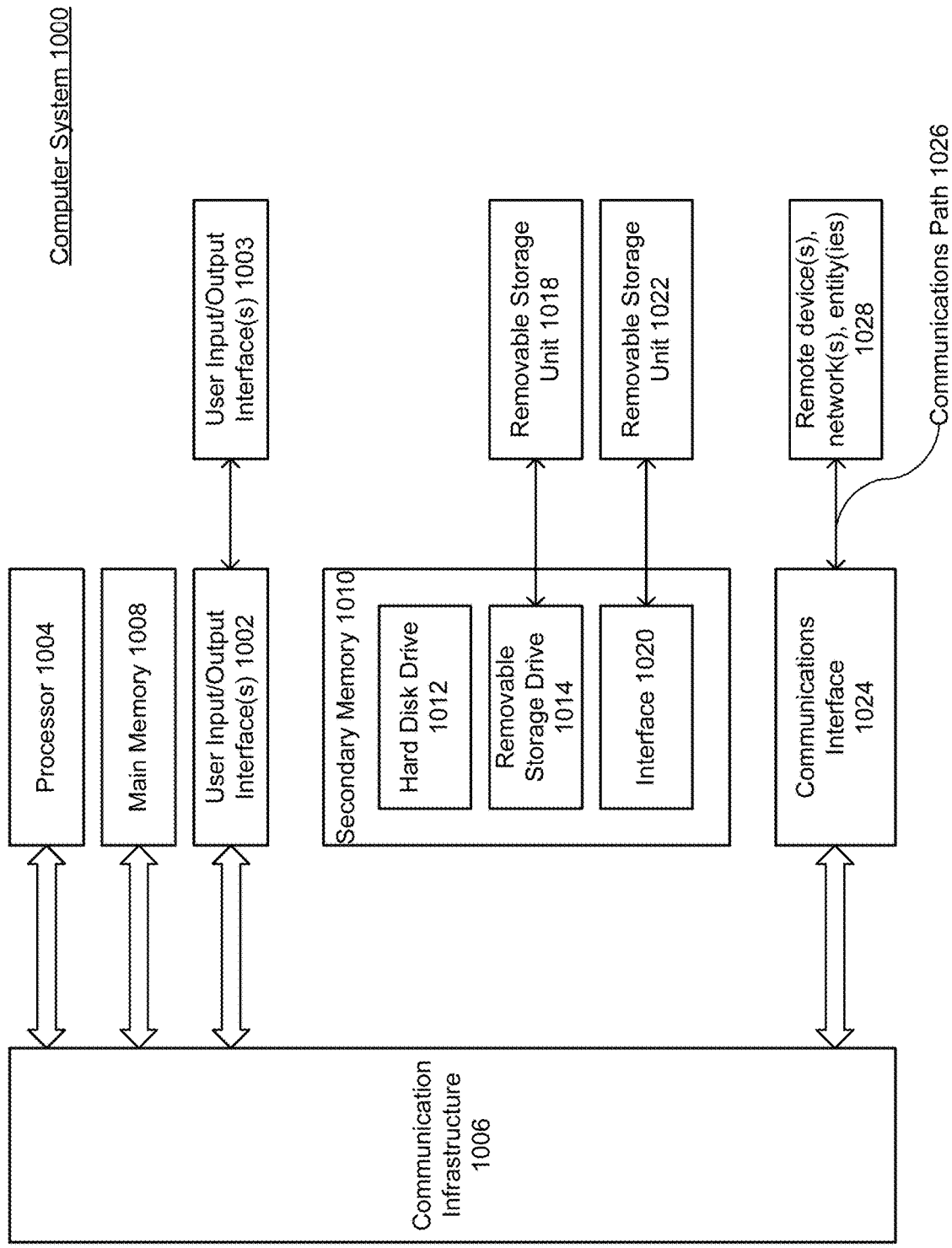
FIG. 10 is an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a first user instruction to associate a first action with a first user-specified gesture such that the first action occurs upon receipt of the first user-specified gesture, wherein the first user-specified gesture relates to a first user input on a display of a user device;
sending a first interaction request to a first website, the first website comprising a first website-specified response associated with a first website-specified user input, such that the first website-specified response is configured to occur upon receipt of the first website-specified user input, wherein the first interaction request includes a request of a first linking of the first user-specified gesture to the first website-specified response, and wherein the first linking is based on the first web site determining that the first action corresponds to the first website-specified response and permitting the first action upon the receipt of the first user-specified gesture; and
receiving a first acceptance message from the first website that indicates that the first user-specified gesture has been successfully linked to the first website-specified response, wherein the first acceptance message includes at least one of a tag permitting access at the first website to the first website-specified response linked to the first user-specified gesture, a text path permitting access at the first web site to the first website-specified response linked to the first user-specified gesture, or an identifier permitting access at the first website to the first website-specified response linked to the first user-specified gesture.

2. The computer-implemented method of claim 1, the receiving of the first user instruction comprising:
receiving a first user selection of the first action for associating with the first user-specified gesture.

3. The computer-implemented method of claim 2, the receiving the first user instruction further comprising:
receiving the first user input on the display of the user device such that the first user-specified gesture is manually drawn onto the display of the user device,
wherein the first interaction request is based on the first user input being provided on the display of the user device.

4. The computer-implemented method of claim 3, the receiving the first user instruction further comprising:
presenting a list of available actions and a list of available gestures;
receiving the first user selection of the first action from the list of available actions; and
receiving a second user selection of the first user-specified gesture from the list of available gestures.

5. The computer-implemented method of claim 4, further comprising:
overriding a first application-specified gesture associated with the first action with the first user-specified gesture based on the second user selection of the first user-specified gesture such that the first website-specified response occurs upon receipt of the first user-specified gesture instead of upon receipt of the first application-specified gesture.

6. The computer-implemented method of claim 1, further comprising:
creating a custom user profile comprising an association between the first user-specified gesture and the first action.

7. The computer-implemented method of claim 6, wherein the association between the first user-specified gesture and the first action defined in the custom user profile is editable by a user.

8. The computer-implemented method of claim 1, further comprising:
providing an interactive overlay to the first website based on the receiving of the first acceptance message,
wherein the interactive overlay is configured to receive the first user-specified gesture and send an instruction to the first website to trigger the first action upon receipt of the first user-specified gesture.

9. The computer-implemented method of claim 1, further comprising: sending a user interface instruction to the first website,
wherein the user interface instruction instructs the first website to dedicate a portion of the display of the user device presenting the first website for receiving the first user-specified gesture.

10. The computer-implemented method of claim 1, wherein:
the first website comprises a first webpage and a second webpage, and the first website permits receipt of a first website-specified user input on the first webpage and receipt of the first user-specified gesture on the first webpage and the second webpage.

11. The computer-implemented method of claim 1, wherein:
the first website comprises a first website-specified gesture associated with the first action, and
the first website overrides the first website-specified gesture with the first user-specified gesture such that the first action occurs upon receipt of the first user-specified gesture instead of upon receipt of the first website-specified gesture.

12. The computer-implemented method of claim 1, wherein the first action relates to moving a display element of the first website or performing a first website-specified function provided upon the display of the user device.

13. The computer-implemented method of claim 1, further comprising:
sending the first interaction request to a second website, the second website comprising a second website-specified response associated with a second website-specified user input, such that the second website-specified response is configured to occur upon receipt of the second website-specified user input, wherein the first interaction request includes a request of a second linking of the first user-specified gesture to the second website-specified response, and wherein the second linking is based on the second website determining that the first action corresponds to the second website-specified response and permitting the first action upon receipt of the first user-specified gesture; and
receiving a second acceptance message from the first website that indicates that the first user-specified gesture has been successfully linked to the second website-specified response.

14. The computer-implemented method of claim 1, further comprising:
receiving a second user instruction to associate a second action with a second gesture such that the second action occurs upon receipt of the second gesture, wherein the second gesture relates to a second user input on the display of the user device,
creating a second interaction request based on the second user instruction;
sending the second interaction request to the first website, wherein the first website further comprises a second website-specified response associated with a second website-specified user input such that the second website-specified response is configured to occur upon receipt of the second website-specified user input, wherein the second interaction request includes a request of a second linking of the second gesture to the second website-specified response, and wherein the second linking is based on the first website determining that the second action corresponds to the second website-specified response and permitting the second action upon the receipt of the second gesture;
receiving a second acceptance message from the first website that indicates that the second gesture has been successfully linked to the first website-specified response; and
sending an interactive overlay to the first website, wherein the interactive overlay is configured to identify receipt of the first user-specified gesture and the second gesture.

15. The computer-implemented method of claim 1, wherein the first action is the first website-specified response such that the first website-specified response occurs upon receipt of the first user-specified gesture.

16. The computer-implemented method of claim 1, wherein the first website presents a plurality of records and a website feature such that the website feature corresponds to performing a website action with respect to the plurality of records upon selection of the website feature, the method further comprising:
providing an interactive overlay for receiving the first user-specified gesture;
receiving the first user-specified gesture;
after receiving the first user-specified gesture, presenting the website feature for a first user selection.

17. The computer-implemented method of claim 16, wherein the website feature includes one or more sub-website features, the method further comprising:
receiving the first user selection of the website feature, presenting the one or more sub-website features for second user selection.

18. The computer-implemented method of claim 17, wherein the first action relates to selecting a sub-website feature.

19. A system, comprising:
a memory; and
a processor coupled to the memory and configured to:
receive a first user instruction to associate a first action with a first user-specified gesture such that the first action occurs upon receipt of the first user-specified gesture, wherein the first user-specified gesture relates to a first user input on a display of a user device;
send a first interaction request to a first website, the first website comprising a first website-specified response associated with a first website-specified user input such that the first website-specified response is configured to occur upon receipt of the first website-specified user input, wherein the first interaction request requests a first linking of the first user-specified gesture to the first website-specified response, and wherein the first linking is based on the first website determining that the first action corresponds to the first website-specified response and permitting the first action upon the receipt of the first user-specified gesture; and
receive a first acceptance message from the first website that indicates that the first user-specified gesture has been successfully linked to the first website-specified response, wherein the first acceptance message includes at least one of a tag permitting access at the first website to the first website-specified response linked to the first user-specified gesture, a text path permitting access at the first web site to the first website-specified response linked to the first user-specified gesture, or an identifier permitting access at the first website to the first website-specified response linked to the first user-specified gesture.

20. A non-transitory computer-readable device having instructions stored thereon that, when executed by at least one computing device, cause the at least one computing device to perform operations comprising:
receiving a first user instruction to associate a first action with a first user-specified gesture such that the first action occurs upon receipt of the first user-specified gesture, wherein the first user-specified gesture relates to a first user input on a display of a user device;
sending a first interaction request to a first website, the first website comprising a first website-specified response associated with a first website-specified user input such that the first website-specified response is configured to occur upon receipt of the first website-specified user input, wherein the first interaction request requests a first linking of the first user-specified gesture to the first website-specified response, and wherein the first linking is based on the first website determining that the first action corresponds to the first website-specified response and permitting the first action upon the receipt of the first user-specified gesture; and receiving a first acceptance message from the first website that indicates that the first user-specified gesture has been successfully linked to the first website-specified response, wherein the first acceptance message includes at least one of a tag permitting access at the first website to the first website-specified response linked to the first user-specified gesture, a text path permitting access at the first web site to the first website-specified response linked to the first user-specified gesture, or an identifier permitting access at the first website to the first website-specified response linked to the first user-specified gesture.

* * * * *